US008660195B2

(12) United States Patent
Fang et al.

(10) Patent No.: US 8,660,195 B2
(45) Date of Patent: Feb. 25, 2014

(54) USING QUANTIZED PREDICTION MEMORY DURING FAST RECOVERY CODING

(75) Inventors: Zheng Fang, San Diego, CA (US); Daniel J. Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 13/198,322

(22) Filed: Aug. 4, 2011

(65) Prior Publication Data

US 2012/0039414 A1 Feb. 16, 2012

Related U.S. Application Data

(60) Provisional application No. 61/376,602, filed on Aug. 24, 2010, provisional application No. 61/372,398, filed on Aug. 10, 2010.

(51) Int. Cl.
*H04B 14/04* (2006.01)

(52) U.S. Cl.
USPC .......................................... 375/242; 375/265

(58) Field of Classification Search
USPC ................. 375/242, 341, 265, 243
See application file for complete search history.

(56) References Cited

U.S. PATENT DOCUMENTS

| 5,717,827 | A * | 2/1998 | Narayan ....................... 704/260 |
| 7,590,525 | B2 | 9/2009 | Chen |
| 7,693,710 | B2 | 4/2010 | Jelinek et al. |
| 2005/0228651 | A1 | 10/2005 | Wang et al. |
| 2008/0033716 | A1 | 2/2008 | Kang et al. |
| 2008/0040122 | A1 | 2/2008 | Chen et al. |
| 2008/0249767 | A1 * | 10/2008 | Ertan ............................. 704/219 |
| 2008/0249768 | A1 * | 10/2008 | Ertan et al. ..................... 704/219 |
| 2009/0198491 | A1 * | 8/2009 | Sato et al. ...................... 704/219 |
| 2010/0174532 | A1 * | 7/2010 | Vos et al. ....................... 704/205 |

OTHER PUBLICATIONS

Chibani, et al., "Fast Recovery for a CELP-Like Speech Codec After a Frame Erasure" IEEE Transactions on Audio, Speech, and Language Processing, vol. 15, No. 8, Nov. 2007, pp. 2485-2495.
De Martin J.C., et al., "Improved Frame Erasure Concealment for CELP-Based Coders", 2000 IEEE International Conference on Acoustics, Speech, and Signal Processing, vol. 3, Jun. 5, 2000, pp. 1483-1486.
Ehara H., et al., "Decoder Initializing Technique for Improving Frame-Erasure Resilience of a CELP Speech Codec", IEEE Transactions on Multimedia, IEEE Service Center, Piscataway, NJ, US, vol. 10, No. 3, Apr. 1, 2008, pp. 549-553, XP011346502, ISSN: 1520-9210, DOI: 10.1109/TMM.2008.917411.
International Search Report and Written Opinion—PCT/US2011/046833—ISA/EPO—Oct. 25, 2011.
Shetty N, et al., "Improving the Robustness of the G.722 Wideband Speech Codec to Packet Losses for Voice Over Wlans" Acoustics, Speech and Signal Processing, 2006. ICASSP 2006 Proceedings. 2006 IEEE International Conference on Toulouse, France May 14-19, 2006, Piscataway, NJ, USA, IEEE, Piscataway, NJ, USA, Jan. 1, 2006, pp. V-V, XP031101521, ISBN: 978-1-4244-0469-8.

(Continued)

*Primary Examiner* — Emmanuel Bayard
(74) *Attorney, Agent, or Firm* — Austin Rapp & Hardman

(57) ABSTRACT

A method for quantizing prediction memory during fast recovery coding is disclosed. A best shape vector that describes prediction memory for a current frame is quantized. It is determined whether to send the quantized best shape vector. The quantized best shape vector is sent based on the determination. An encoded current frame is sent.

52 Claims, 12 Drawing Sheets

(56) References Cited

OTHER PUBLICATIONS

Zhongbo Li, et al., "Correcting State Error by Making Full Use of Late Packet for Prediction-Based Decoding in VoIP" 2008 4TH International Conference on Wireless Communications, Networking and Mobile Computing, 1.
Oct. 2008 (2008-10-OI), pp. 1-5, XP55008733, DOI: 10.1109/WiCom.2008.798 ISBN: 978-1-42-442107-7.

* cited by examiner

USING QUANTIZED PREDICTION MEMORY DURING FAST RECOVERY CODING

RELATED APPLICATIONS

This application is related to and claims priority from U.S. Provisional Patent Application Ser. No. 61/372,398 filed Aug. 10, 2010, for "Systems, Methods, and Apparatus for Error Resilience for Predictive Speech Codecs," and from U.S. Provisional Patent Application Ser. No. 61/376,602 filed Aug. 24, 2010, for "Using Quantized Prediction Memory During Fast Recovery Coding."

TECHNICAL FIELD

The present disclosure relates generally to electronic devices for communication systems. More specifically, the present disclosure relates to using quantized prediction memory during fast recovery coding.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

In some configurations, successful decoding of speech may depend on previous speech. This may create problems when previously received speech was corrupted. Therefore, benefits may be realized by systems and methods for using quantized prediction memory during fast recovery coding.

SUMMARY OF THE INVENTION

A method for quantizing prediction memory during fast recovery coding is disclosed. A best shape vector that describes prediction memory for a current frame is quantized. It is determined whether to send the quantized best shape vector. The quantized best shape vector is sent based on the determination. An encoded current frame is sent.

An indication of whether the best shape vector is more accurate than previous prediction memory for one or more previous frames may be determined. The indication may be sent based on the determination of whether the best shape vector is more accurate than previous prediction memory for one or more previous frames. Quantized location and quantized energy of the prediction memory for the current frame may be sent based on the determination of whether to send the quantized best shape vector.

The quantized best shape vector, quantized location, quantized energy and the indication may be sent for every frame. Alternatively, the quantized best shape vector, quantized location, quantized energy and the indication may be sent based on source-controlled parameters or channel-controlled parameters or both. The source-controlled parameters may include a ratio of an adaptive codebook contribution in the encoded current frame to a fixed codebook contribution in the encoded current frame. The channel-controlled parameters may include available bandwidth in a transmission channel or packet loss rate in a wireless communication system.

The indication of whether the best shape vector is more accurate than previous prediction memory for one or more previous frames may be determined. This determination may include reconstructing a best residual signal using a fixed codebook contribution to the encoded current frame and a fast recovery adaptive codebook contribution that is based on the shape vector. This determination may also include selecting previous prediction memory and determining previous prediction memory residual signals based on each previous prediction memory. This determination may also include modifying a bit for each selected previous prediction memory in previous prediction memory comparison bits based on a comparison of the previous prediction memory residual signals and the best residual signal. This determination may also include including an index of the best shape vector and the previous prediction memory comparison bits in encoded shape bits. The best residual signal may be a residual signal with a maximum weighted signal-to-noise ratio (SNR). The location of the prediction memory may be a relative location with maximum amplitude in a portion of a previous frame.

A transmitting terminal for quantizing prediction memory during fast recovery coding is also disclosed. The transmitting terminal includes a processor and memory in electronic communication with the processor. Executable instructions are stored in the memory. The instructions are executable to quantize a best shape vector that describes prediction memory for a current frame. The instructions are also executable to determine whether to send the quantized best shape vector. The instructions are also executable to send the quantized best shape vector based on the determination. The instructions are also executable to send an encoded current frame.

A transmitting terminal for quantizing prediction memory during fast recovery coding. The transmitting terminal includes means for quantizing a best shape vector that describes prediction memory for a current frame. The transmitting terminal also includes means for determining whether to send the quantized best shape vector. The transmitting terminal also includes means for sending the quantized best shape vector based on the determination. The transmitting terminal also includes means for sending an encoded current frame.

A computer-program product for quantizing prediction memory during fast recovery coding is also disclosed. The computer-program product comprises a computer-readable medium having instructions thereon. The instructions include code for quantizing a best shape vector that describes prediction memory for a current frame. The instructions also include code for determining whether to send the quantized best shape vector. The instructions also include code for code for sending the quantized best shape vector based on the determination. The instructions also include code for code for sending an encoded current frame.

A method for using quantized prediction memory during fast recovery coding is also disclosed. An encoded current frame and encoded prediction memory that includes location, shape and energy are received. The received encoded prediction memory is decoded if a previous frame was an erasure. The encoded current frame is decoded using best prediction memory if the previous frame was an erasure.

The best prediction memory may be determined from among the decoded received prediction memory and previous prediction memory for one or more previous received frames. The encoded current frame may be decoded using stored previous prediction memory if the previous frame was not an erasure. The location of the prediction memory may be a relative location with maximum amplitude in a portion of a previous frame. The shape may describe a portion of a previous frame. The energy may describe the energy of a previous frame.

A receiving terminal for quantizing prediction memory during fast recovery coding is also disclosed. The receiving terminal includes a processor and memory in electronic communication with the processor. Executable instructions are stored in the memory. The instructions are executable to receive an encoded current frame and encoded prediction memory that comprises location, shape and energy. The instructions are also executable to decode the received encoded prediction memory if a previous frame was an erasure. The instructions are also executable to decode the encoded current frame using best prediction memory if the previous frame was an erasure.

A receiving terminal for using quantized prediction memory during fast recovery coding is also disclosed. The receiving terminal includes means for receiving an encoded current frame and encoded prediction memory that comprises location, shape and energy. The receiving terminal also includes means for decoding the received encoded prediction memory if a previous frame was an erasure. The receiving terminal also includes means for decoding the encoded current frame using best prediction memory if the previous frame was an erasure.

A computer-program product for using quantized prediction memory during fast recovery coding. The computer-program product comprises a computer-readable medium having instructions thereon. The instructions include code for causing a receiving terminal to receive an encoded current frame and encoded prediction memory that comprises location, shape and energy. The instructions also include code for causing a receiving terminal to decode the received encoded prediction memory if a previous frame was an erasure. The instructions also include code for causing a receiving terminal to decode the encoded current frame using best prediction memory if the previous frame was an erasure.

DETAILED DESCRIPTION

Voice communication may suffer from quality degradation caused by packet losses and frame erasures. Some speech codecs, such as the Enhanced Variable Rate CODEC (EVRC) or Adaptive Multi-Rate (AMR) audio codec, are predictive codecs. In these codecs, the dependencies between adjacent frames are exploited to reduce the bit rate. However this dependency may cause degraded performance when there are frame erasures. In other words, the incorrect decoding or corruption of a frame may affect the quality of later frames because the decoding of later frames may rely on the frame.

The present systems and methods may use an error-resilience technique to enable speech decoding to recover faster when one or more frame erasures happen. This fast recovery coding may be optimal in both quality (by using a closed-loop quantization scheme) and bit rate (by using source and channel controlled scheme). In other words, the present systems and methods may mitigate the quality degradation caused by packet losses or frame erasures in voice communication. More specifically, fast recovery coding may quantize the prediction memory and send it along with the regularly coded bits. This prediction memory may be used to decode a current frame when the previous frame is an erasure. In addition, the proposed error-resilience technology may be source-controlled, channel-controlled or both.

Figure 1:
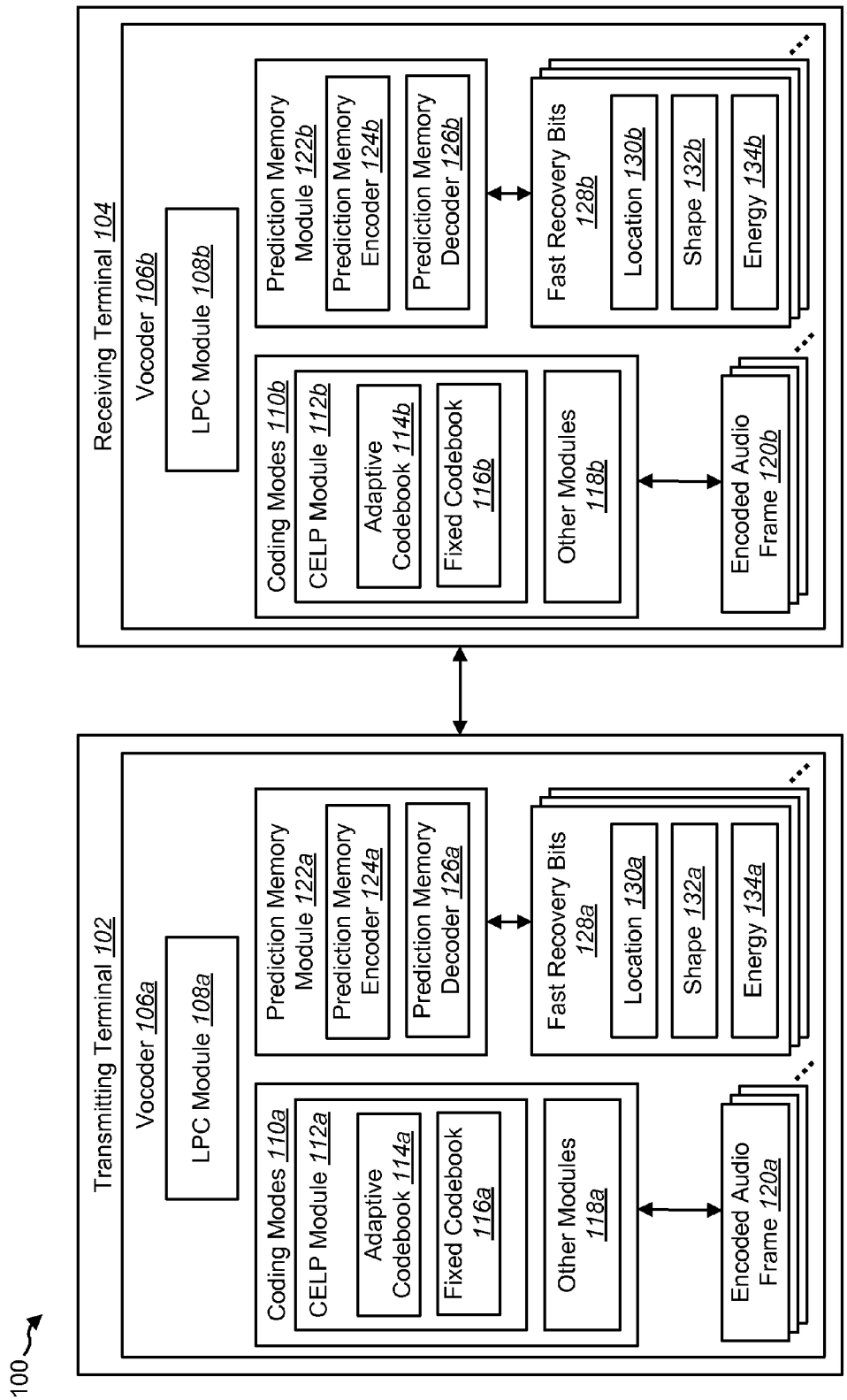
FIG. 1 is a block diagram illustrating a system that uses quantized prediction memory during fast recovery coding.

FIG. 1 is a block diagram illustrating a system 100 that uses quantized prediction memory during fast recovery coding. The system 100 may include a transmitting terminal 102 that sends data to a receiving terminal 104. The transmitting terminal 102 and receiving terminal 104 may be any devices that are capable of supporting voice communications, including phones, computers, audio broadcast and receiving equipment, video conferencing equipment or the like.

In one configuration, the transmitting terminal 102 or receiving terminal 104 may be a wireless communication device or a base station. The system 100 may be implemented with wireless multiple access technology, such as Code Division Multiple Access (CDMA) capability. CDMA is a modulation and multiple access scheme based on spread-spectrum communications. As used herein, the term "wireless communication device" refers to an electronic device that may be used for wireless voice communication, data communication or both. Examples of wireless communication devices include cellular phones, personal digital assistants (PDAs), handheld devices, wireless modems, laptop computers, personal computers, etc. A wireless communication device may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. The term "base station" refers to a wireless communication station that is installed at a fixed location and used to communicate with wireless communication devices. A base station may alternatively be referred to as an access point, a Node B, an evolved Node B or some other similar terminology.

The transmitting terminal 102 and receiving terminal 104 may each include a vocoder 106a-b. The vocoder 106a-b may encode, or compress, audio for wireless transmission at the transmitting terminal 102 and decode, or uncompress, the audio at the receiving terminal 104. In at least one configuration of the transmitting terminal 102, speech may be input to the vocoder 106a-b in frames, with each frame further partitioned into sub-frames, e.g., 20 ms. These arbitrary frame boundaries may be used where some block processing is performed. However, the speech samples may not be partitioned into frames (and sub-frames) if continuous processing rather than block processing is implemented.

The vocoder 106a-b may include a Linear Predictive Coding (LPC) module 108a-b. The LPC module 108a at the transmitting terminal 102 may analyze the speech by estimating the formants and removing their effects from the speech. The residual signal may be coded thereafter. The LPC module 108b at the receiving terminal 104 may synthesize the speech by reversing the process. In particular, the LPC module 108b at the receiving terminal 104 may use the residual speech to create the speech source, use the formants to create a filter (which represents the vocal tract), and run the speech source through the filter to synthesize the speech.

Following LPC analysis at the transmitting terminal 102, the residual signal may be coded. In one configuration, a coding mode 110a-b is chosen based on the characteristics of a particular audio frame, e.g., a Prototype Pitch Period (PPP) mode, a Code Excited Linear Prediction (CELP) mode or a Noise Excited Linear Prediction (NELP) mode to encode and decode audio frames. For example, EVRC-B may use PPP, CELP and NELP. On the other hand, EVRC-WB may use only CELP and NELP. Additionally, AMR and AMR-WB (two Universal Mobile Telecommunications System (UMTS) codecs) may use CELP only. Therefore, the type of coding may depend on the specific system used. While the present systems and methods are described using CELP, the fast recovery coding described herein may be used with any predictive coding scheme that relies on a previous frame to decode a current frame.

CELP modules 112a-b may be used to encode speech with poor periodicity or speech that involves changing from one periodic segment to another. Thus, CELP may be used to code frames classified as transient speech. Since it may be difficult to accurately reconstruct such frames from only one prototype pitch period, CELP modules 112a-b may encode characteristics of the complete speech frame. This may produce accurate speech reproduction, but use a higher bit rate. CELP coding may use an adaptive codebook 114a-b contribution and a fixed codebook 116a-b contribution. In some codecs, CELP may be used to encode all speech frames with different characteristics, such as voiced speech frames, unvoiced speech frames and transient speech frames, e.g., AMR, EVRC, AMR-WB.

The vocoder 106a-b may also include other modules 118a-b. For example, a Prototype Pitch Period (PPP) module (not shown) may be used to code frames classified as voiced speech that includes slowly time varying periodic components. By exploiting the periodicity of voiced speech, PPP may achieve a lower bit rate than CELP and still reproduce the speech signal in a perceptually accurate manner. Furthermore, a NELP module (not shown) may code frames classified as unvoiced speech. More specifically, the NELP module may be used to encode speech that is noise-like in character, such as unvoiced speech or background noise. NELP may use the simplest model for the coded speech, and therefore may achieve a lower bit rate.

Once produced, the encoded audio frames 120a-b may be transmitted to the receiving terminal 104. However, some of the encoded audio frames 120a-b may not be received correctly, i.e., a frame erasure may be declared at the receiving terminal 104. In one configuration the vocoder 106a-b may receive an indication of whether the current frame is erased from a modem or voice application. Some coding techniques rely on previous frames to decode current frames. For example, CELP decoding may use prediction memory determined from a previous frame to determine an adaptive codebook 114a-b contribution in a current frame. Therefore, a single frame erasure may also negatively affect subsequent frames.

The present systems and methods may use an error-resilience technique, referred to herein as "fast recovery," to enable fast recovery of decoded speech following one or more frame erasures. In other words, the term "fast recovery coding" refers to a coding method that allows fast recovery at the decoder from frame erasures. A prediction memory module 122a-b may be used to quantize and de-quantize prediction memory. Prediction memory may be data from a previous frame that is used to decode the current frame, i.e., the prediction memory for frame N may be data describing some or all of frame N-1. In CELP, the prediction memory may be referred to as pitch memory.

During fast recovery coding, prediction memory may quantized by a prediction memory encoder 124a-b into fast recovery bits 128a and sent along with other regular encoded bits, i.e., with the encoded audio frame(s) 120a-b. If there are no erasures, then the fast recovery bits 128b may not be used at the receiving terminal 104. However, if an erasure happens, in the first good frame following the erasure, the prediction memory may be de-quantized from the fast recovery bits 128a-b (using a prediction memory decoder 126a-b) and used to replace the existing prediction memory that is corrupted due to the erasure. By using quantized prediction memory, the speech waveform in the current frame may be reconstructed in a more accurate way.

The fast recovery bits 128a-b may include location bits 130a-b, shape bits 132a-b and energy bits 134a-b that are quantized based on closed loop optimal criterion. The quantization of prediction memory may be source-controlled and channel-controlled to achieve the best tradeoff between quality and bit rate. As used herein, the term "source-controlled" describes limiting an action (e.g., quantizing the prediction memory) based on characteristics of source audio at the transmitting terminal 102. In one configuration, the quantization of the prediction memory may depend, at least partially, on the ratio of an adaptive codebook 114a-b contribution to a fixed codebook 116a-b contribution in an encoded audio frame 120a-b, e.g., quantizing the prediction memory if the ratio is higher than a predetermined threshold. In other words, if this ratio is high, the current frame may be highly dependent on a previous frame, so the prediction memory may be quantized into fast recovery bits 128a-b and transmitted. In contrast, the fast recovery bits 128a-b may not be sent when the ratio is low, i.e., when the current frame is not highly dependent on a previous frame. Alternatively, the fast recovery bits 128a-b may be sent for every frame, but only used when it provides better reconstruction than without the fast recovery bits 128a-b. As used herein, the term "channel-controlled" describes limiting an action based on transmission characteristics. For example, the prediction memory may be more likely to be quantized and transmitted if there is available bandwidth in the transmission channel or if the packet loss rate is high.

Figure 2:
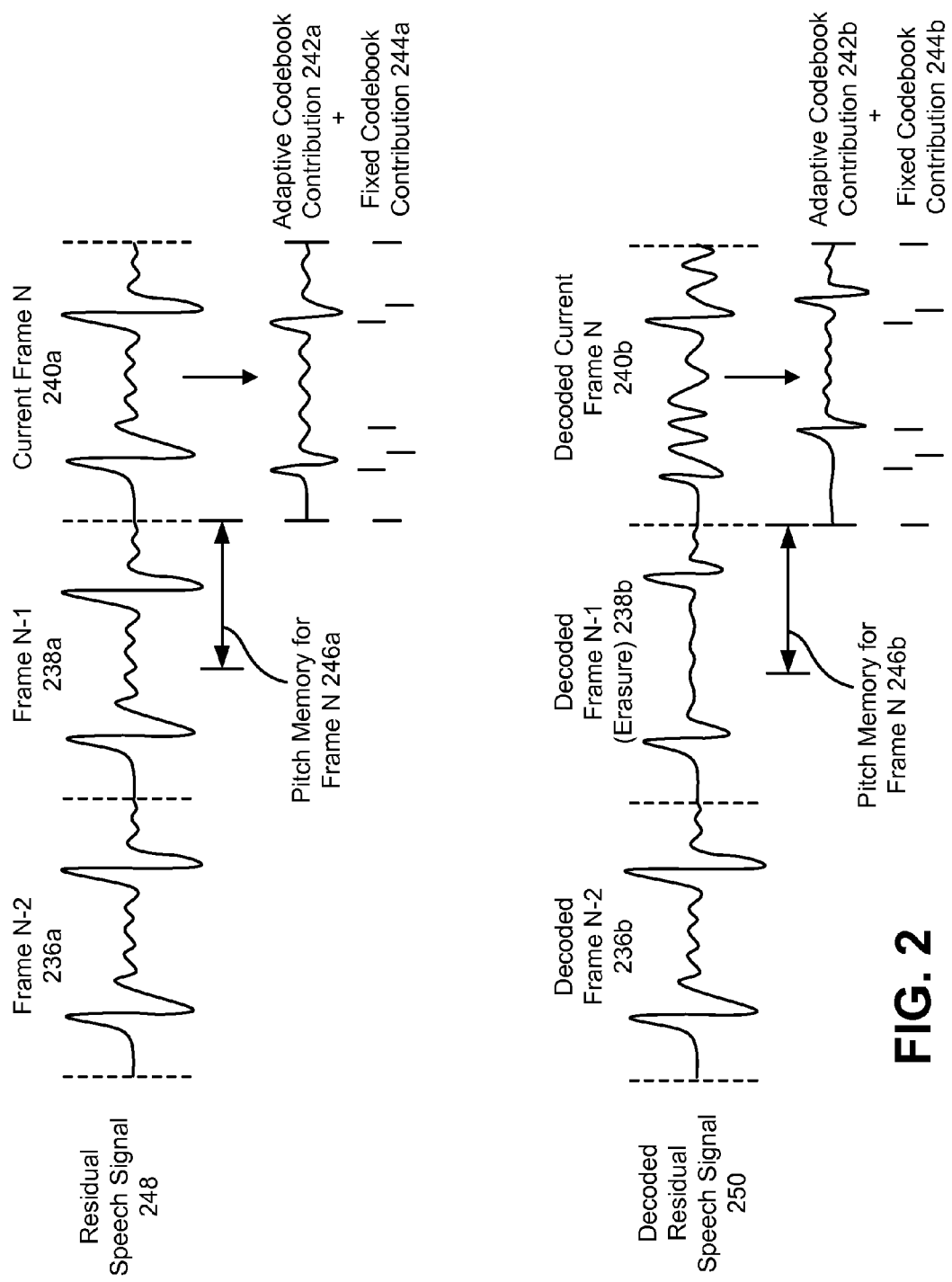
FIG. 2 is a set of waveforms illustrating encoding and decoding using Code Excited Linear Prediction (CELP)

FIG. 2 is a set of waveforms illustrating encoding and decoding using Code Excited Linear Prediction (CELP). Specifically, the top half of FIG. 2 illustrates the residual speech frames 248 after LPC analysis according to their index, i.e., frame (N-2) 236a, followed by frame (N-1) 238a, followed by current frame N 240a. Although illustrated using CELP, the present systems and methods may be used for fast recovery from erasures in systems using any predictive coding method. In CELP, the encoder may receive a series of frames 236a, 238a, 240a. The decoding of current frame N 240a may rely on prediction memory (referred to as pitch memory 246a-b in CELP) determined from frame (N-1) 238a. In other words, the pitch memory for frame N 246 may be determined from frame (N-1) 238a. For example, the pitch memory for frame N 246a may be constructed from the residual signal for the last pitch cycle in frame N-1 238a. The pitch memory for frame N 246a (determined from frame (N-1) 238a) may be used to determine an adaptive codebook contribution 242a. The difference between the adaptive codebook contribution 242a and the residual speech signal 248 may be quantized into the fixed codebook contribution 244a, i.e., the fixed codebook contribution 244a may represent a quantization error in the adaptive codebook contribution 242a. Therefore, encoded audio frames may include an adaptive codebook contribution 242a and a fixed codebook contribution 244a.

The bottom half of FIG. 2 represents the decoded residual speech signal 250. In other words, the decoded residual speech signal 250 may represent the received encoded audio frames that are decoded at a receiving terminal 104. The decoded residual speech signal 250 may include decoded frame (N-2) 236b, followed by decoded frame (N-1) 238b, followed by decoded current frame N 240b. Decoded frame (N-1) 238b may not have been decoded correctly and a frame erasure may be declared at the receiving terminal 104. However, in one configuration, the decoder may still determine prediction memory 246b from decoded frame (N-1) 238b when determining the adaptive codebook contribution 242b of the current frame N 240b. Since decoded frame (N-1) 238b has been corrupted, the errors in decoded frame (N-1) 238b may be propagated into the decoded adaptive codebook contribution 242b. Therefore, the final decoded current frame N 240b, even after the fixed codebook contribution 244b is added, may not be an accurate representation of the original current frame N 240a.

Instead of determining the pitch memory for frame N 246b at the receiving terminal 104, in fast recovery coding, the transmitting terminal 102 may quantize the pitch memory for frame N 246a into fast recovery bits and transmit them to the receiving terminal 104. The receiving terminal 104 may decode the fast recovery bits into prediction memory (i.e., pitch memory in CELP) and use the received pitch memory, instead of the pitch memory for frame N 246b, to decode the current frame N 240b. This may reduce the propagation of errors following frame erasures.

Figure 3:
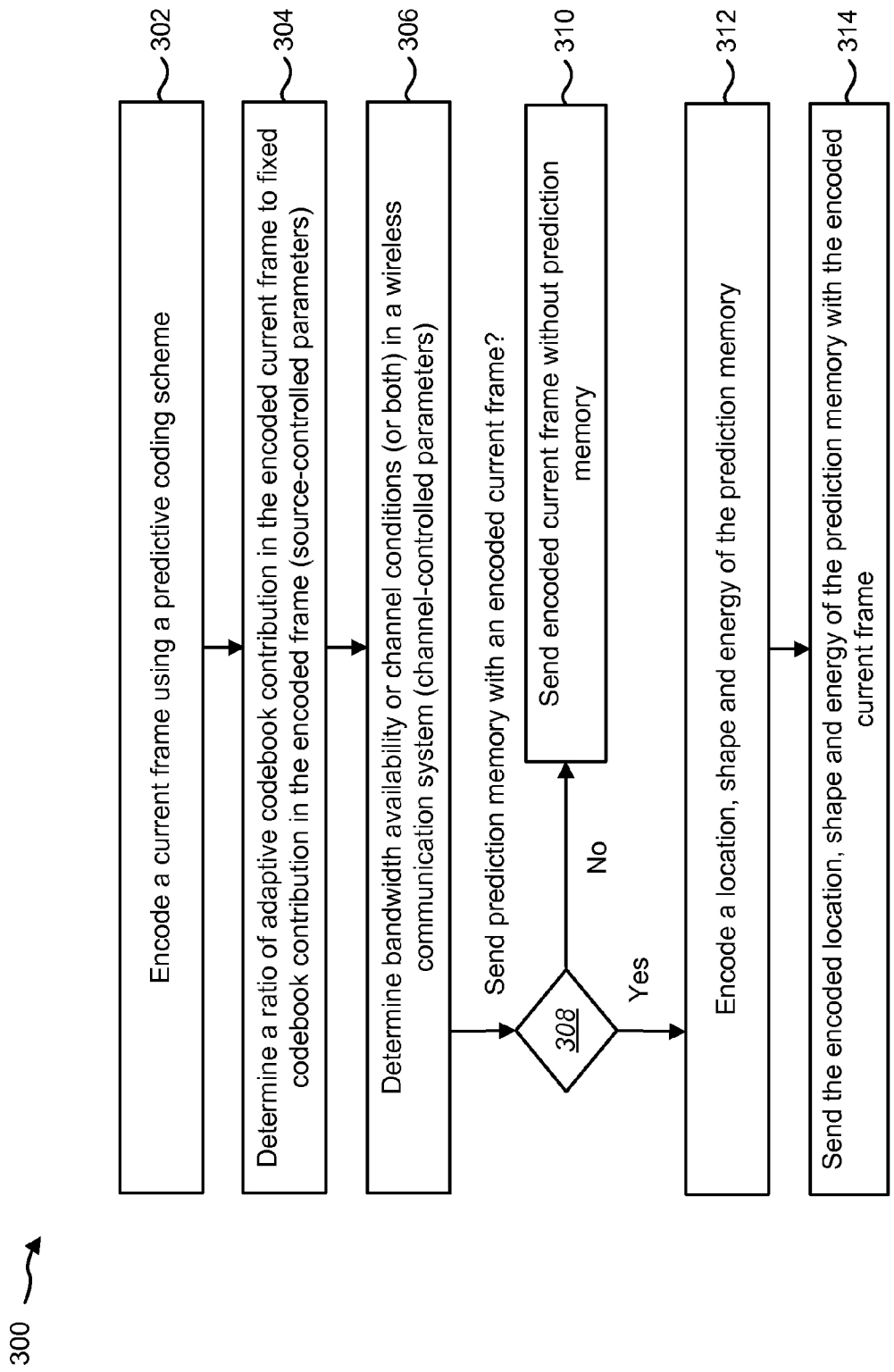
FIG. 3 is a flow diagram illustrating a method for quantizing prediction memory during fast recovery coding.

FIG. 3 is a flow diagram illustrating a method 300 for quantizing prediction memory during fast recovery coding. The method 300 may be performed by a transmitting terminal 102. The transmitting terminal 102 may encode 302 a current frame using a predictive coding scheme, i.e., a coding scheme that relies on a previous frame to decode a current frame, such as CELP. The transmitting terminal 102 may also determine 304 a ratio of adaptive codebook contribution 242a in the encoded current frame to fixed codebook contribution 244a in the encoded frame. This ratio may indicate whether the current frame is highly dependent on the previous frame, i.e., source-controlled parameters. The transmitting terminal 102 may also determine 306 bandwidth availability or channel conditions (or both) in a wireless communication system, i.e., channel-controlled parameters. The transmitting terminal 102 may also determine 308 whether to send prediction memory with an encoded current frame based on the source-controlled parameters or the channel-controlled parameters or both. The prediction memory may be pitch memory that is determined from a previous frame, i.e., frame N-1. The transmission of prediction memory may be source-controlled, i.e., determined using source-controlled parameters. For example, a high adaptive codebook contribution 242a to fixed codebook contribution 244a ratio may indicate a frame that is highly dependent on the previous frame and so the prediction memory should be quantized and transmitted. In contrast, a low ratio may indicate that the current frame is not highly dependent on the previous frame and so the prediction memory should not be quantized and transmitted. Similarly, fast recovery may also be adapted based on bandwidth availability or channel conditions, i.e., based on channel-controlled parameters. For example, the fast recovery technique may be adaptively enabled and disabled to achieve any specified average bit rate.

In one configuration, the prediction memory may be quantized and sent to a receiving terminal every frame and a receiving terminal 104 may selectively use the quantized prediction memory. In this configuration, the receiving terminal 104 may only use the fast recovery bits 128b if it provides the most accurate reconstructed current frame as indicated by the transmitting terminal 102, i.e., if the fast recovery bits 128b produce the best prediction memory.

Therefore, the encoder may always send fast recovery bits 128a-b or only send the fast recovery bits 128a-b based on source-controlled or channel-controlled parameters. However, regardless of the conditions under which the fast recovery bits 128a-b are sent, the receiving terminal may only use the fast recovery bits 128a-b when they are the best option for recovering, i.e., if the fast recovery bits 128b produce the most accurate prediction memory.

If the transmitting terminal 102 determines 308 not to send prediction memory, it may send 310 the encoded current frame without prediction memory. If, however, the transmitting terminal 102 determines 308 to send prediction memory, it may encode 312 a location, shape and energy of the prediction memory, i.e., into fast recovery bits 128a-b. The shape bits 132a-b may describe the shape of the pitch memory. The energy bits 134a-b may describe the energy, or volume, of the pitch memory. The unquantized shape may be equal to or shorter than the pitch memory. Hence, the location bits 130a-b may describe some location information so that the decoder may use that to determine where to put the shape to produce accurate unquantized pitch memory. In one configuration, the location bits 130a-b may indicate the relative location of the maximum amplitude within the pitch memory. In other words, the encoding may include quantizing the prediction memory to produce fast recovery bits. The transmitting terminal 102 may also send 314 the encoded location 130a-b, shape 132a-b and energy 134a-b of the prediction memory with the encoded current frame.

Figure 4:
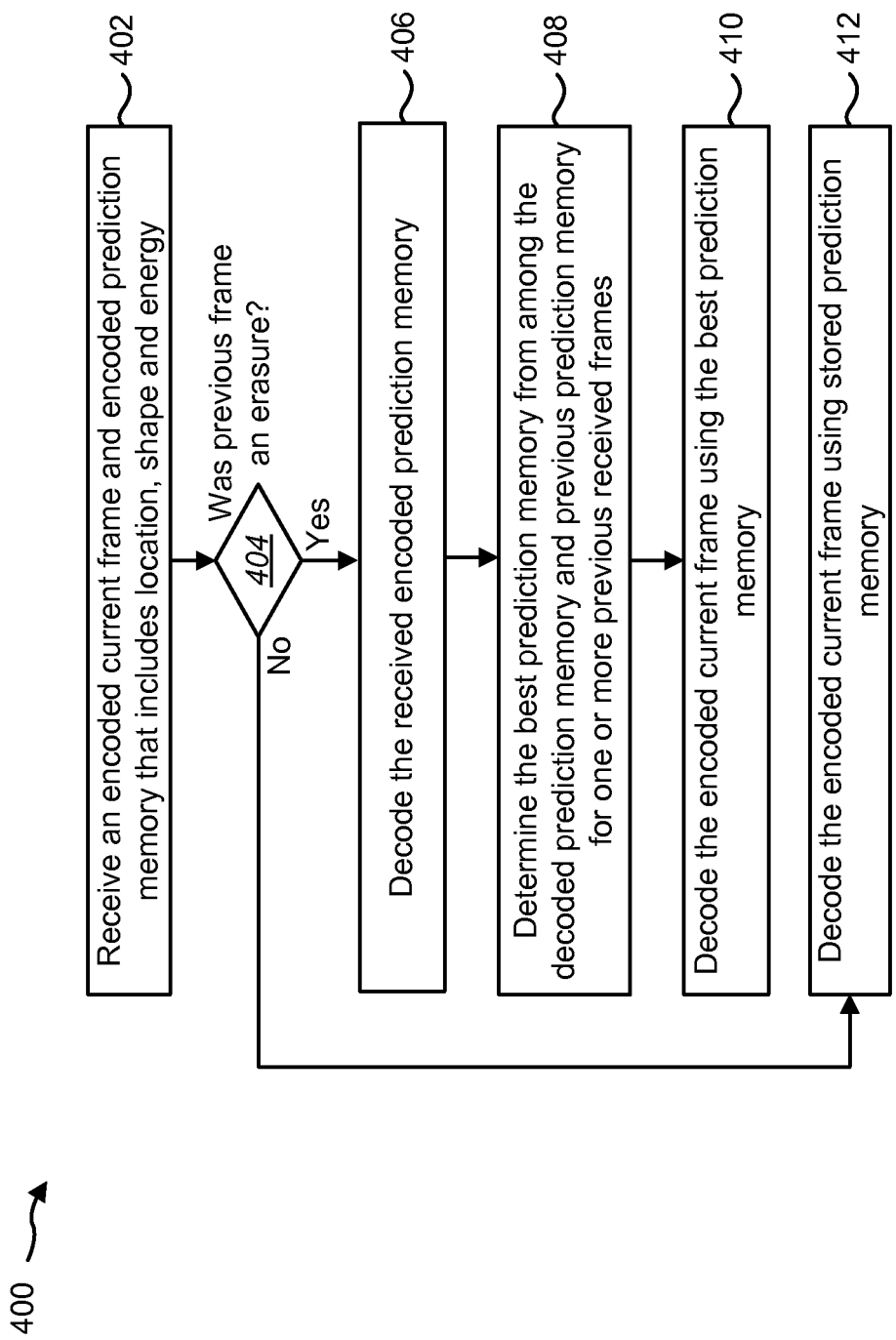
FIG. 4 is a flow diagram illustrating a method for using quantized prediction memory during fast recovery coding.

FIG. 4 is a flow diagram illustrating a method 400 for using quantized prediction memory during fast recovery coding. The method 400 may be performed by a receiving terminal 104. The receiving terminal 104 may receive 402 an encoded current frame and encoded prediction memory (i.e., fast recovery bits 128b) that includes location bits 130a-b, shape bits 132a-b and energy bits 134a-b. The receiving terminal 104 may have knowledge of the encoded prediction memory because it may be received in a different type of frame than one without the encoded prediction memory. The receiving terminal 104 may determine 404 if the previous frame was an erasure. If not, the receiving terminal 104 may decode 412 the encoded current frame using stored prediction memory, i.e., determined from the decoded previous frame. In other words, the receiving terminal 104 may ignore the received encoded prediction memory when the previous frame was not an erasure. However, if the previous frame was an erasure, the receiving terminal 104 may decode 406 the received encoded prediction memory. The receiving terminal 104 may also determine 408 the best prediction memory from among the decoded prediction memory and previous prediction memory for one or more previous received frames. For example, if frame N is the current frame, but prediction memory determined from frame N-2 (i.e., before the erasure) produces a more accurate frame N than the fast recovery bits 128b, then the prediction memory determined from frame N-2 may be used instead of the received fast recovery bits 128b. In one configuration, the fast recovery bits 128b may include previous prediction memory comparison bits to help the receiving terminal 104 determine 408 the best prediction memory, e.g., whether the fast recovery bits 128b produce more accurate prediction memory than prediction memory for frames before the erasure.

The receiving terminal 104 may also decode 410 the encoded current frame using the best prediction memory. In other words, when the previous frame was an erasure, the receiving terminal may use the received prediction memory (i.e., fast recovery bits 128b) instead of determining prediction memory from the decoded previous frame.

Figure 5:
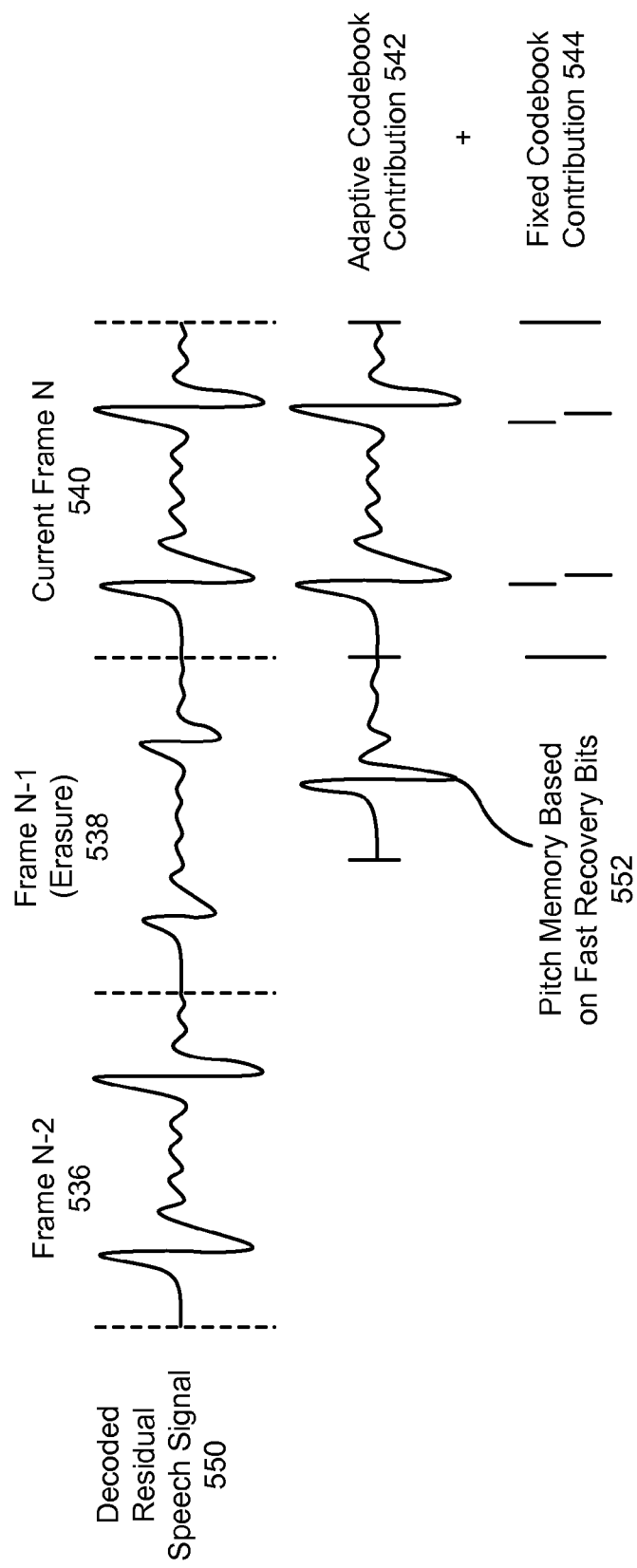
FIG. 5 is a set of waveforms illustrating decoding using fast recovery bits.

FIG. 5 is a set of waveforms illustrating decoding using fast recovery bits. The top waveform may be the decoded residual speech signal 550 at a receiving terminal 104. Specifically, frame (N-2) 536 may be received and decoded (e.g., using CELP) correctly. However, frame (N-1) 538 may be corrupted and an erasure may be declared at the receiving terminal 104. Frame (N-1) 538 may be reconstructed, however, it may not be highly accurate, i.e., it may not match the originally encoded frame (N-1) (not shown). Therefore, if pitch memory for current frame N 540 is determined based on the reconstructed frame (N-1) 538, the errors in frame (N-1) 538 may be propagated to the current frame N 540.

Instead, the receiving terminal 104 may determine pitch memory based on fast recovery bits 552. In other words, rather than determining pitch memory from the previous frame (N-1) 538, the receiving terminal 104 may use received fast recovery bits 128b to determine pitch memory for current frame N 540. An adaptive codebook contribution 542 may be determined using the pitch memory based on fast recovery bits 552, i.e., fast recovery bits sent along with the encoded current frame N. A fixed codebook contribution 544 that represents the error in adaptive codebook quantization may then be added to the adaptive codebook contribution 542 to form the decoded current frame 540.

Figure 6:
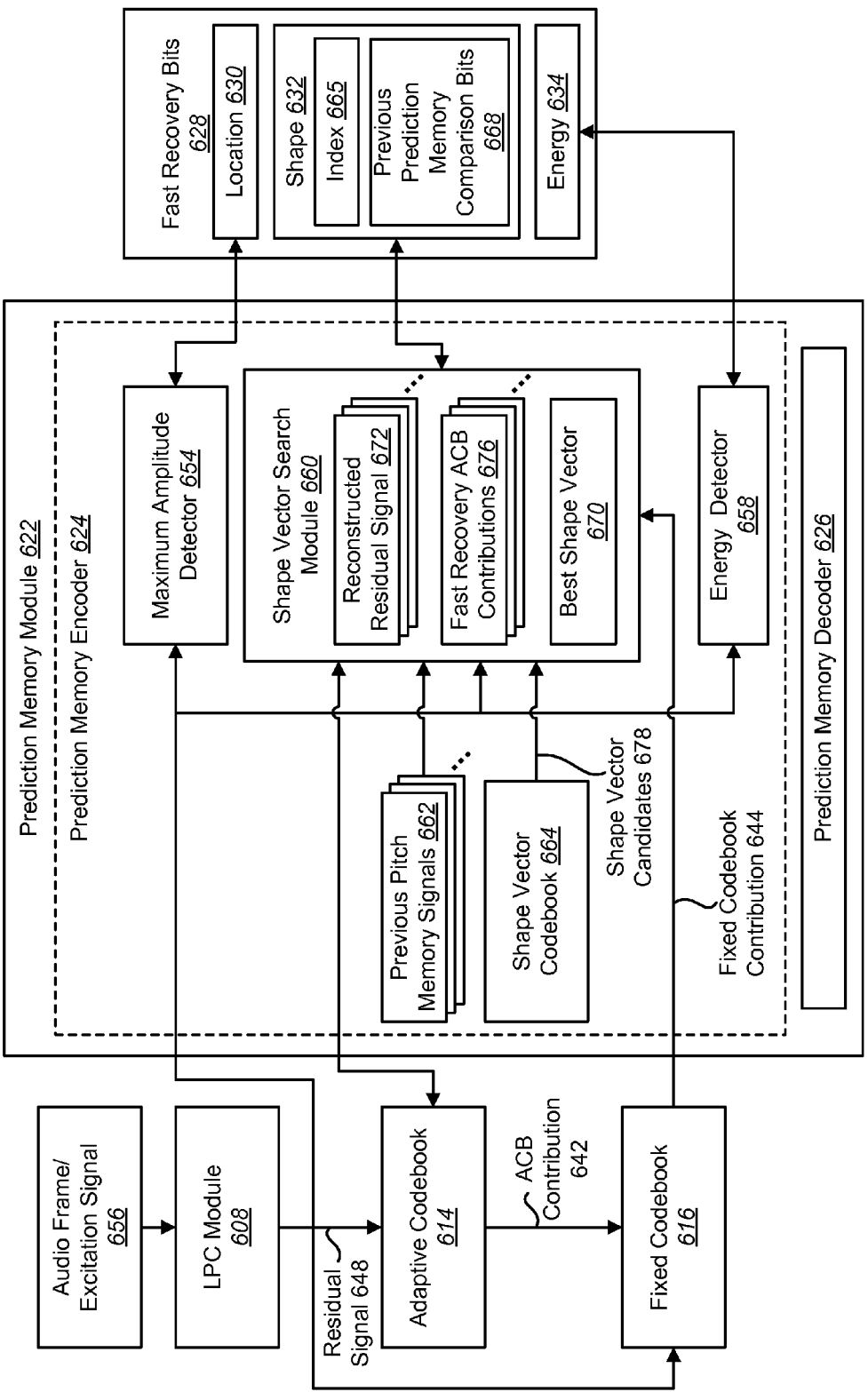
FIG. 6 is a block diagram illustrating a prediction memory module.

FIG. 6 is a block diagram illustrating a prediction memory module 622. The prediction memory module 622 may include a prediction memory encoder 624 and a prediction memory decoder 626. The prediction memory encoder 624 may determine the location bits 630, shape bits 632 and energy bits 634 in the fast recovery bits 628 that may be transmitted to a receiving terminal 104. In one configuration, the quantization of prediction memory may be closed loop by reusing the analysis-by-synthesis framework available in CELP codecs. The current audio frame may first be coded in the normal way. Then, the prediction memory may be quantized.

An LPC module 608 may determine a residual signal 648 from an audio frame/excitation signal 656. An adaptive codebook (ACB) may be used to determine an adaptive codebook (ACB) contribution 642 from a portion of the residual signal 648, e.g., a portion of the residual signal 648 corresponding to a previous frame may be used to determine an adaptive codebook contribution 642 for the current frame. The difference between the adaptive codebook contribution 642 and the residual speech signal 648 may be quantized into the fixed codebook contribution 644 using a fixed codebook 616, i.e., the fixed codebook contribution 644 may represent a quantization error in the adaptive codebook contribution 642. Therefore, encoded audio frames may include an adaptive codebook contribution 642 and a fixed codebook contribution 644.

One possible way to help a decoder recover from a frame erasure when using predictive coding may be to quantize and send the location 630 (e.g., phase information) and energy 634 of prediction memory from an encoder. Then, at the decoder, an artificial waveform may be created and scaled using the transmitted location 630 and energy 634. In other words, this configuration does not quantize or send the actual shape 632 of the prediction memory at the encoder, but instead creates an artificial waveform at the decoder, e.g., based on a signal classification parameter such as a signal-to-noise ratio of the signal. However, the artificial waveform may not be very accurate because it is not based on the actual shape 632 of the prediction memory. In contrast, the present systems and methods may quantize the shape 632 of the prediction memory using a shape vector codebook 664. Therefore, the present systems and methods may produce prediction memory at the decoder that is more accurate than a configuration that uses an artificial waveform based on a signal classification parameter.

The location bits 630 in the fast recovery bits 628 may be determined using a maximum amplitude detector 654 that determines the relative location of the maximum amplitude in a portion of the residual signal 648. The energy bits 634 may be determined using an energy detector 658 based on the residual signal 648. For example, the energy of the residual signal 648 may be quantized using a scalar quantizer.

A shape vector search module 660 may use a closed-loop search to optimally search for the best prediction memory. The best prediction memory may be determined from among a set of previous pitch memory signals 662 (prior to the previous frame) and a shape vector codebook 664. The best shape vector 670 may refer to the shape vector that most accurately describes the prediction memory among the shape vector candidates 678 in a shape vector codebook 664. However, the best shape vector 670 may not produce the best prediction memory, i.e., one of the previous pitch memory signals 662 may be better. The best prediction memory may be indicated using previous prediction memory comparison bits 668 that indicate whether the best shape vector 670 is more accurate than previous prediction memory signals 662 for one or more previous frames.

The shape vector codebook 664 may be a new codebook or may reuse an existing codebook used for other purposes. The terms "code vector" and "shape vector" may be used interchangeably herein. A shape vector may describe the shape of the pitch memory. For example, if the current frame being encoded is frame N, the shape vector may describe the pitch memory for the current frame N, which is a portion of frame N-1. The shape vector may be determined from one or more previous pitch memory signals 662 that are not immediately previous. For example, pitch memory for frame N may be determined from a portion of frame N-2 or frame N-3.

The shape vector bits 632 may include two parts. The first part may be the bits that indicate the index 665 of the best shape vector 670 in the shape vector codebook 664. The second part may be the bits that indicate whether each of the previous pitch memories provides better performance than the best shape vector 670 from the shape vector codebook 664, i.e., the previous prediction memory comparison bits 668. For example, if the current frame being encoded is frame N, then the previous pitch memories (pitch memory for frame N-1, which is a portion of frame N-2, and pitch memory for frame N-2, which is a portion of frame N-3) may be used as the candidates for the best prediction memory for the current frame N. One bit for each previous pitch memory signal 662 may be included in the previous prediction memory comparison bits 668 to indicate whether it is more accurate than the best shape vector 670 from the shape vector codebook 664. The previous pitch memories 662 may provide better performance than the best shape vector 670 from the shape vector codebook. However, the previous pitch memories 662 may not be available at the receiving terminal 104 since there may be multiple erasures in a row before the current frame.

In order to search for the best shape vector 670, the shape vector search module 660 may simulate the actions of the decoder when decoding the frame, i.e., analysis by synthesis. First, the shape vector search module 660 may determine the best shape vector 670 from the shape vector codebook 664. To do this, a different fast recovery adaptive codebook contribution 676 may be determined for each shape vector candidate 678, i.e., every shape vector in the shape vector codebook 664. In other words, the fast recovery adaptive codebook contributions 676 may each be determined using a different shape vector candidate 678 as though it was received in fast recovery bits 628. Reconstructed residual signals 672 may be formed by combining each fast recovery adaptive codebook contribution 676 with the fixed codebook contribution 644. The reconstructed residual signal 672 with the best (maximum) weighted signal-to-noise ratio (SNR), given the de-quantized fixed codebook contribution 644, may be used to find the best shape vector 670, i.e., the reconstructed residual signal 672 that is minimally different than the original residual signal 648 may identify the best shape vector 670. In other words, the shape vector candidate 678 associated with the fast recovery adaptive codebook contribution 676 that formed the most accurate reconstructed residual signal 672 may be the best shape vector 670. In one configuration, simpler open-loop criteria may be used to search for the best shape vector 670, for example, to compare each shape vector candidate 678 to the pitch memory based on correlation or mean square error.

The shape vector search procedure described above may be first used to determine the best shape vector 670 in the shape vector codebook 664, i.e., the best shape vector 670. The first part of the fast recovery shape bits 128b may describe the index 665 within the shape vector codebook 664 of the best shape vector 670, i.e., the index 665 may be the quantized shape vector 670. Then the same search procedure may be applied to determine whether each of previous pitch memory signals 662 provides better performance than the best shape vector 670. In other words, the best shape vector 670 may not produce the best prediction memory, e.g., prediction memory determined from frame N-2 may be more accurate than the best shape vector 670. Therefore, in the second part of the fast recovery shape bits 632 (i.e., the previous prediction memory comparison bits 668), one bit may be used for each of the previous pitch memory signals 662 to indicate whether it is more accurate than the best shape vector 670 for the reconstruction of the current frame when the previous frame is lost. For example, two bits may be used to describe whether previous pitch memory signals 662 for frame N-1 and pitch memory signal for frame N-2 provide better prediction memory than the best shape vector 670 for reconstruction of the current frame N when the previous frame is lost.

In one configuration, an encoded frame may include an adaptive codebook contribution 642, a fixed codebook contribution 644 and LPC parameters (not shown). These three things may be used at a receiving terminal 104 to decode the current frame when the previous frame is not an erasure. However, in addition, a transmitting terminal 102 may send fast recovery bits 628 to help decode the current frame when the previous frame is an erasure. The encoded frame data may always be sent. However, the fast recovery bits 628 may be sent conditionally based on source-controlled parameters and/or channel-controlled parameters. Alternatively, the fast recovery bits 628 may also be sent for every frame.

Figure 7:
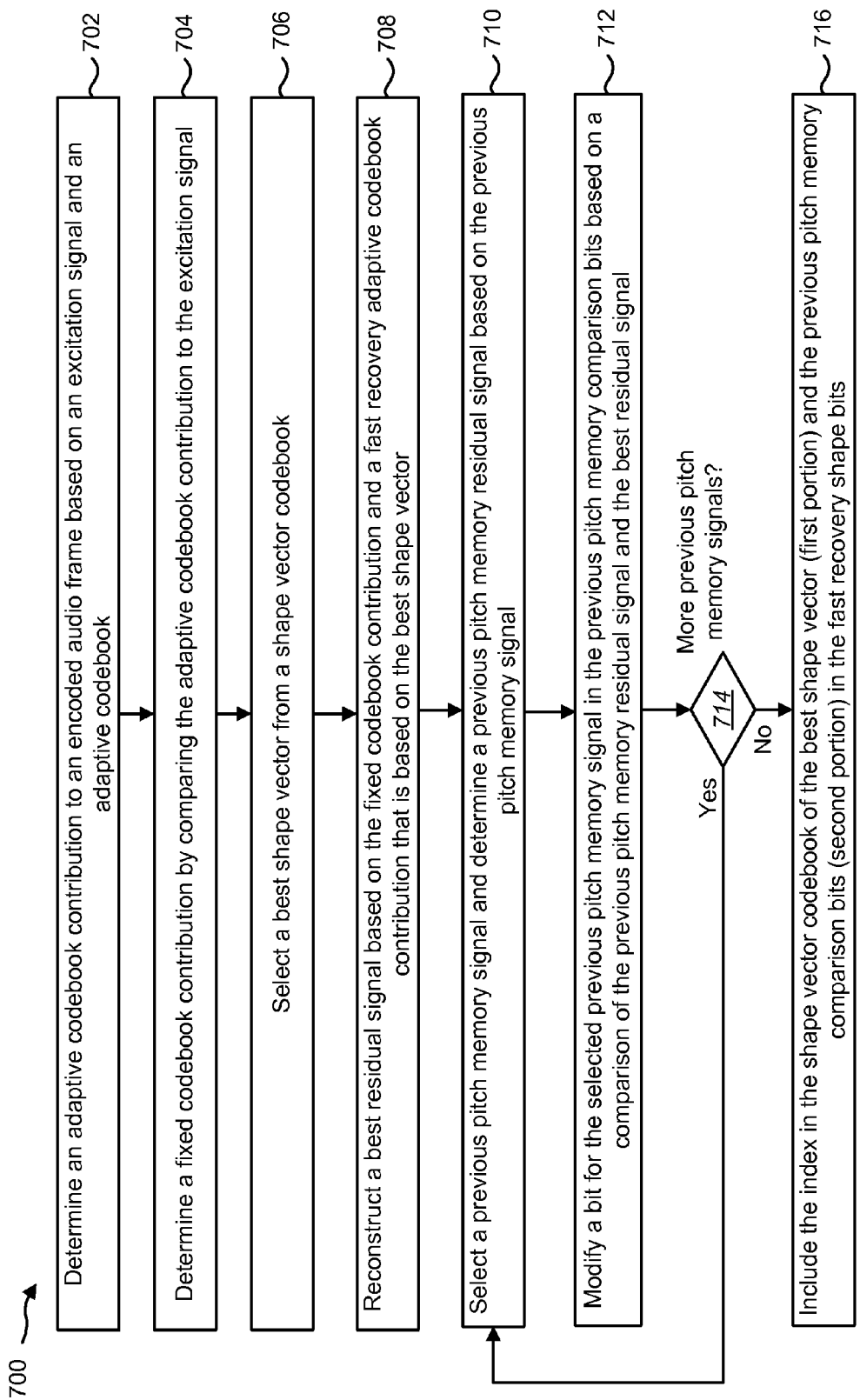
FIG. 7 is a flow diagram illustrating a method for searching for the best prediction memory.

FIG. 7 is a flow diagram illustrating a method 700 for searching for the best prediction memory. The method 700 may be performed by a transmitting terminal 102. The best prediction memory may be from either the best shape vector 670 or a previous pitch memory 662.

The transmitting terminal 102 may determine 702 an adaptive codebook contribution 642 to an encoded audio frame based on an excitation signal 656 (or residual signal 648) and an adaptive codebook 614. The transmitting terminal 102 may also determine 704 a fixed codebook contribution 644 by comparing the adaptive codebook contribution 642 to the excitation signal 656 (or residual signal 648). The transmitting terminal 102 may also select 706 a best shape vector 670 from a shape vector codebook 664. This may include selecting the shape vector candidate 678 (from the shape vector codebook 664) that produces the reconstructed residual signal 672 with the best weighted signal-to-noise ratio (SNR). The transmitting terminal 102 may also reconstruct 708 a best residual signal based on the fixed codebook contribution 644 and a fast recovery adaptive codebook contribution 676 that is based on the best shape vector 670, i.e., the best residual signal may be the reconstructed residual signal 672 using the best shape vector 670. The transmitting terminal 102 may also select 710 a previous pitch memory signal 662 and determine a previous pitch memory residual signal based on the previous pitch memory signal 662, i.e., reconstruct a residual signal using the selected previous pitch memory signal instead of using the best shape vector 670.

The transmitting terminal 102 may also modify 712 a bit for the selected previous pitch memory signal 662 in the previous prediction memory comparison bits 668 based on a comparison of the previous pitch memory residual signal and the best residual signal (i.e., the reconstructed residual signal 672 associated with the best shape vector 670). In one configuration, this comparison may include determining if the previous pitch memory residual signal has a better (maximum) weighted signal-to-noise ratio (SNR) than the best residual signal. One bit for each of previous pitch memory signals 662 may be transmitted in the previous prediction memory comparison bits 668 to indicate whether the corresponding previous pitch memory signal 662 is better than the best shape vector 670. More specifically, a 1 may be inserted in the previous prediction memory comparison bits 668 for previous pitch memory signals 662 that are better than the best shape vector 670 in the shape vector codebook 664 and a 0 for previous pitch memory signals 662 that are worse than the best shape vector 670. The transmitting terminal 102 may also determine 714 if there are more previous pitch memory signals 662 to be tested. If yes, the transmitting terminal 102 may select a new previous pitch memory signal 662 to test. If not, the transmitting terminal 102 may include 716 the index 665 of the best shape vector 670 from the shape vector codebook 664 and the previous prediction memory comparison bits 668 in the fast recovery shape bits 628.

Figure 8:
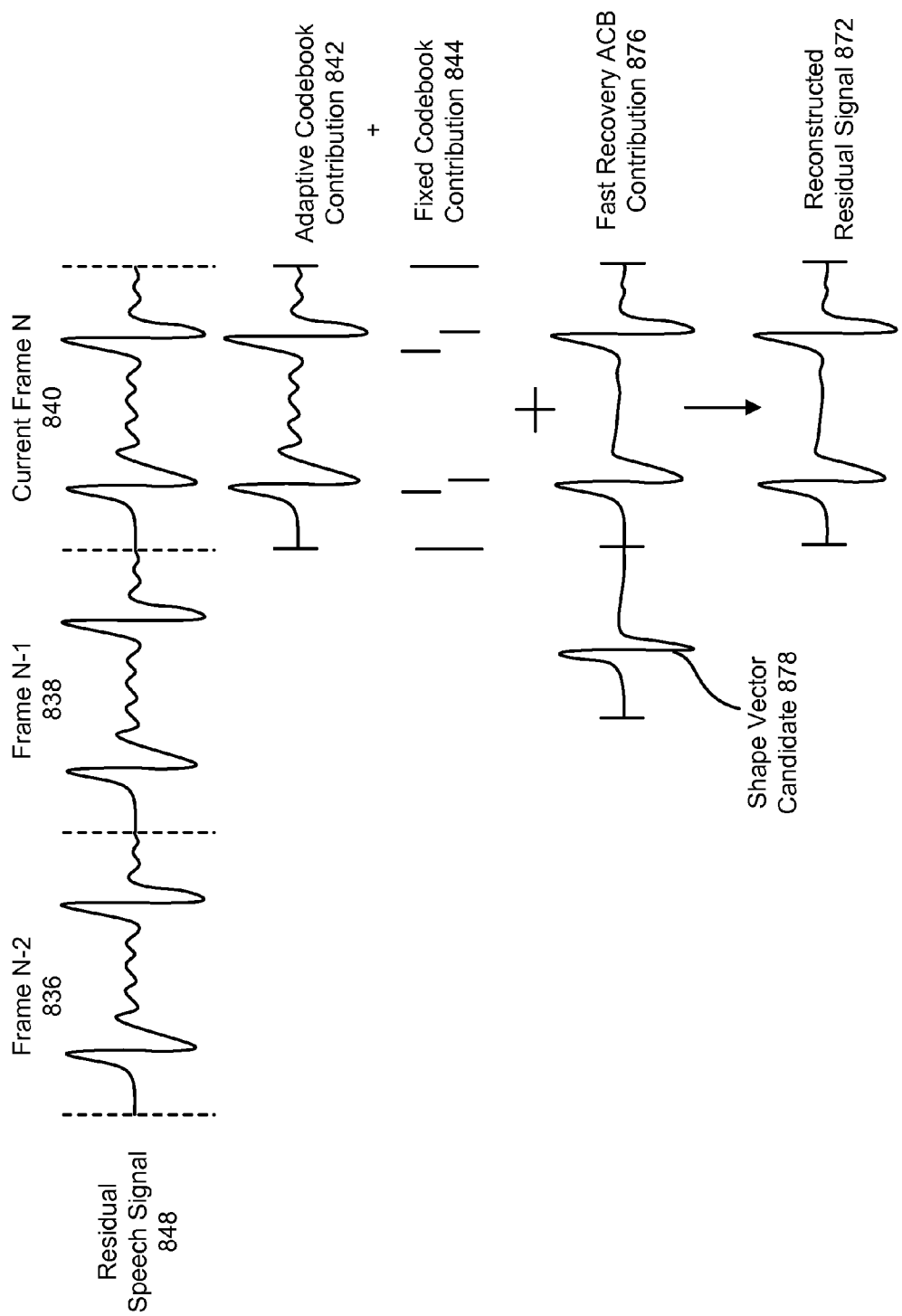
FIG. 8 is a set of waveforms that illustrate searching for the best shape vector at a transmitting terminal.

FIG. 8 is a set of waveforms that illustrate searching for the best shape vector 670 at a transmitting terminal 102. The top waveform represents the frames in an excitation signal 656 or residual signal 848. The adaptive codebook (ACB) contribution 842 for the current frame N 840 may be determined based on the previous frame (N-1) 838 that follows frame (N-2) 836. The fixed codebook contribution 844 may be determined by comparing the adaptive codebook contribution 842 to the excitation signal 656 or residual signal 848, i.e., the fixed codebook contribution 844 may represent an error in the adaptive codebook contribution 842. This may follow traditional CELP encoding.

However, a fast recovery adaptive codebook contribution 876 may be determined for each shape vector candidate 878, i.e., a fast recovery adaptive codebook contribution 876 is determined again for each shape vector candidate 878 (each vector in a shape vector codebook 664). Each fast recovery adaptive codebook contribution 876 may be combined with the fixed codebook contribution 844 to determine a reconstructed residual signal 872, i.e., based on fast recovery. The most accurate (i.e., best) reconstructed residual signal 872 may be used to identify the best shape vector 670. In one configuration, the best reconstructed residual signal 872 may be the reconstructed residual signal 872 with the maximum weighted SNR. The shape vector candidate 878 used to create the fast recovery adaptive codebook contribution 876 in the best reconstructed residual signal 872 may be the best shape vector 670.

Figure 9:
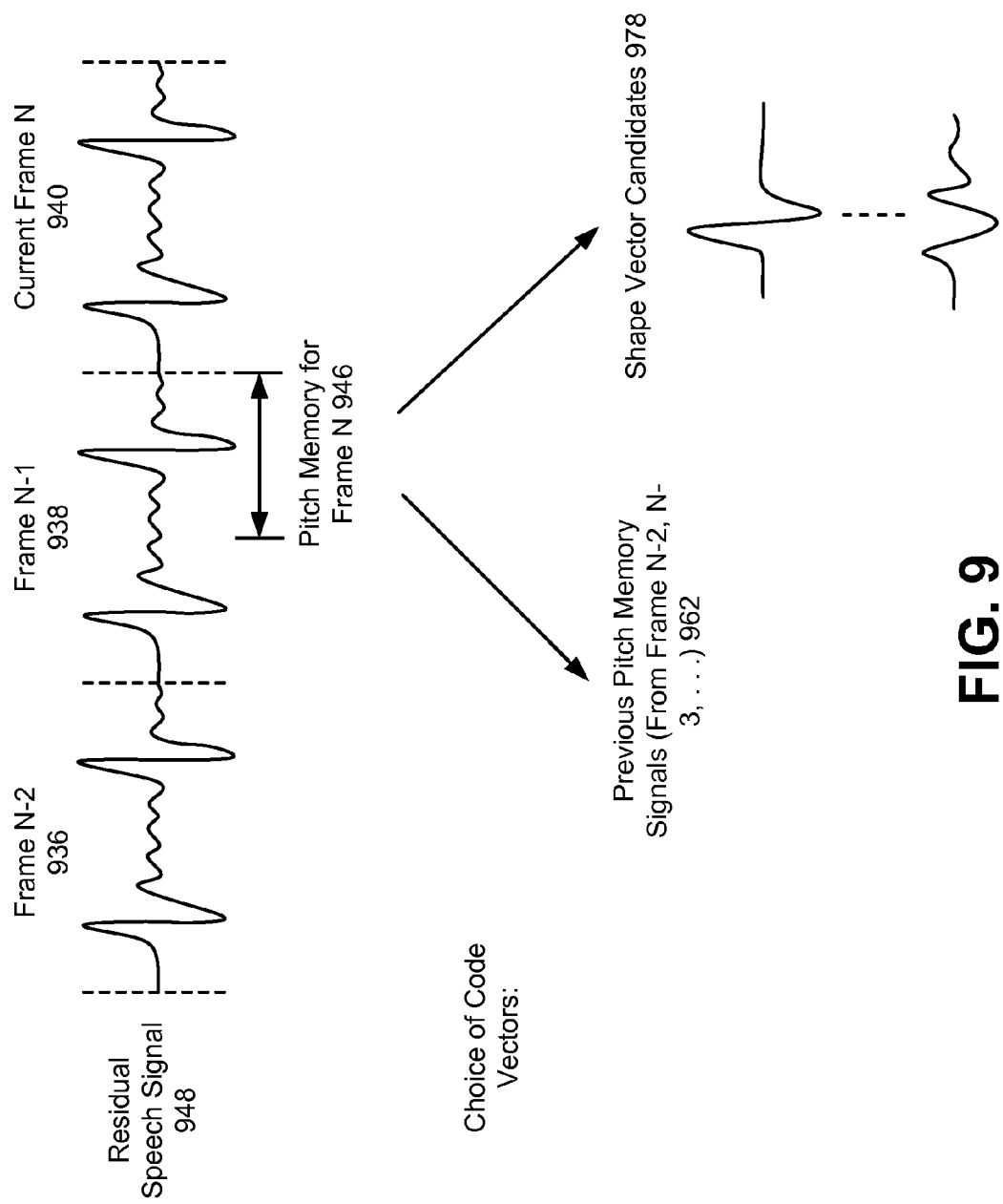
FIG. 9 is a set of waveforms that illustrates shape vector candidates that may be quantized in the fast recovery bits.

FIG. 9 is a set of waveforms that illustrates shape vector candidates that may be quantized in the fast recovery bits. The top waveform illustrates a residual speech signal 948 (or excitation signal 656) that may include frame (N-2) 936, frame (N-1) 938 and a current frame N 940. When decoding current frame N 940 using CELP, pitch memory for frame N 946 may be determined from frame (N-1) 938. When selecting the best prediction memory, the encoder may use previous pitch memory signals 962 from before frame N-1 (e.g., from frame (N-2) 936, frame (N-3) (not shown)) or from pre-trained code vectors (i.e., shape vector candidates 978). Therefore, the best pitch memory may be determined from either the best shape vector 670 (i.e., one of the shape vector candidates 978) or from previous pitch memory signals 962.

Figure 10:
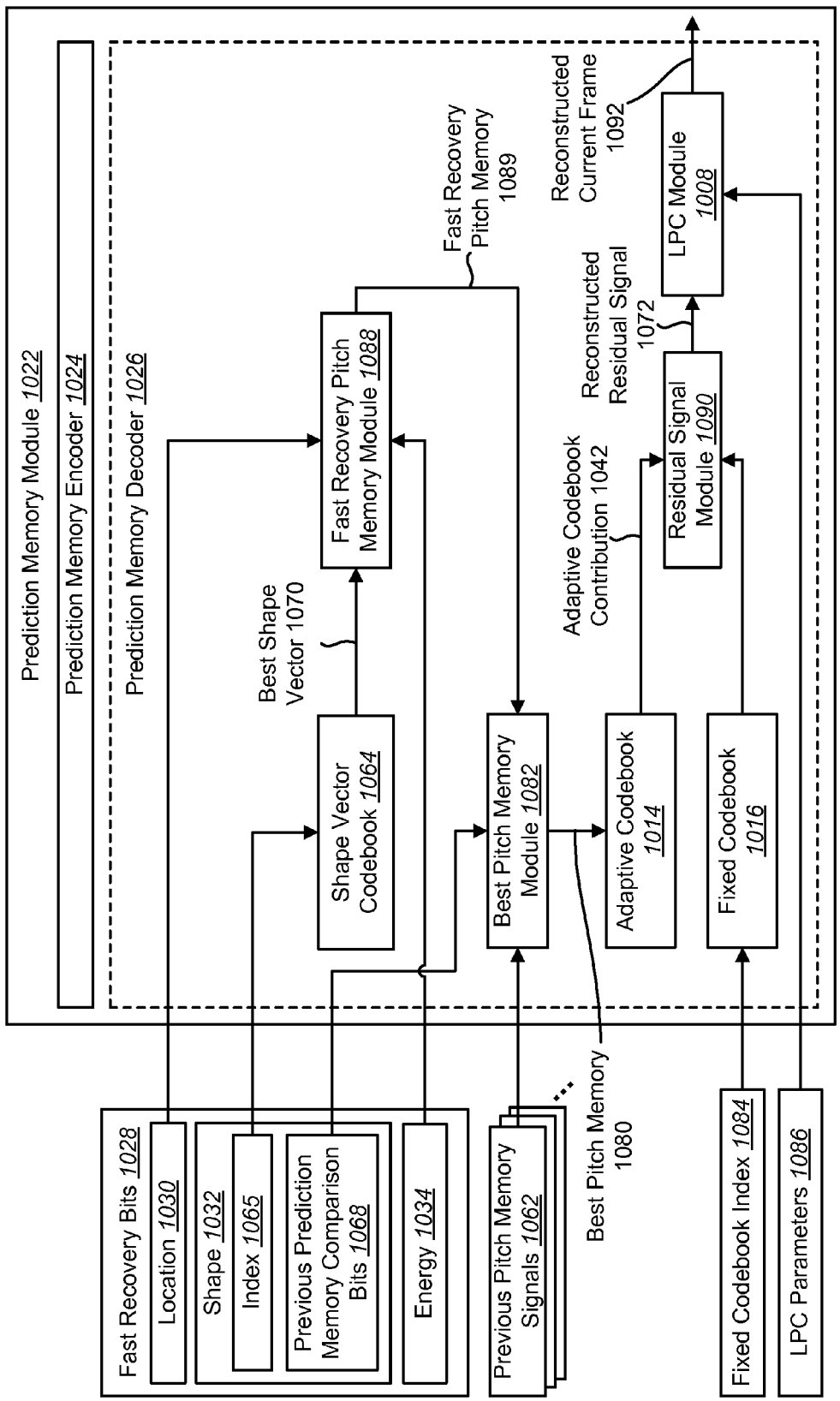
FIG. 10 is another block diagram illustrating a prediction memory module, e.g., at a receiving terminal.

FIG. 10 is another block diagram illustrating a prediction memory module 1022, e.g., at a receiving terminal 104. The prediction memory module 1022 may include similar functionality and use similar data to the prediction memory module 622 illustrated in FIG. 6. Specifically, the prediction memory encoder 1024, fast recovery bits 1028, location bits 1030, shape bits 1032, shape index 1065, previous prediction memory comparison bits 1068, energy bits 1034, shape vector codebook 1064, adaptive codebook 1014, fixed codebook 1016 and LPC module 1008 may correspond and have similar functionality to the prediction memory encoder 624, fast recovery bits 628, location bits 630, shape bits 632, shape index 665, previous prediction memory comparison bits 668, energy bits 634, shape vector codebook 664, adaptive codebook 614, fixed codebook 616 and LPC module 608 illustrated in FIG. 6.

The prediction memory module 1022 may also include a prediction memory decoder 1026 that determines best pitch memory 1080 for the decoding of a current frame. The prediction memory decoder 1026 may receive fast recovery bits 1028, previous pitch memory signals 1062, a fixed codebook index 1084 and LPC parameters 1086 from a transmitting terminal 102. If an erasure is not declared for a previous frame, the receiving terminal 104 may not use the fast recovery bits 1028. Rather, the receiving terminal 104 may decode the current frame using the previous pitch memory signals 1062 (i.e., determined from previously received frames).

If the previous frame is an erasure, the fast recovery bits 1028 may be used to determine the best pitch memory 1080, which may then be used to decode the current frame, i.e., determine the adaptive codebook contribution 1042 in the current frame. The best shape vector 1070 may be determined from the index bits 1065 using a shape vector codebook 1064. The best shape vector 1070, the location bits 1030 and the energy bits 1034 may be input to a fast recovery pitch memory module 1088 to determine fast recovery pitch memory 1089, i.e., reconstructed pitch memory for the current frame using the fast recovery bits 1028.

A best pitch memory module 1082 may then determine the best pitch memory 1080 using the fast recovery pitch memory 1089 and the previous pitch memory signals 1062 (determined from previous frames). This may include using the previous prediction memory comparison bits 1068 in the fast recovery bits 1028 that indicate whether a previous prediction memory signal 1062 is better than the best shape vector 1070 and is available, i.e., not erased. If the comparison bits 1068 indicate that none of the previous pitch memory signals 1062 are more accurate than the fast recovery pitch memory 1089 (determined from the best shape vector 1070), the fast recovery pitch memory 1089 may be used as the best pitch memory 1080. On the other hand, if the comparison bits 1068 indicate that at least one of the previous pitch memory signals 1062 are more accurate than the fast recovery pitch memory 1089 (determined from the best shape vector 1070), one of the previous pitch memory signals 1062 may be used as the best pitch memory 1080. If there are multiple previous pitch memory signals 1062 that are better than the fast recovery pitch memory 1089, the previous pitch memory signal 1062 that is closest to the current frame is used.

Once the best pitch memory 1080 is determined, it may be used to determine an adaptive codebook contribution 1042 using the adaptive codebook 1014. A fixed codebook index 1084 may determine a fixed codebook contribution that is combined with the adaptive codebook contribution 1042 in a residual signal module 1090 to produce a reconstructed residual signal 1072 for the current frame. An LPC module 1008 may synthesize the reconstructed current frame 1092 using the transmitted LPC parameters 1086 for the current frame.

Figure 11:
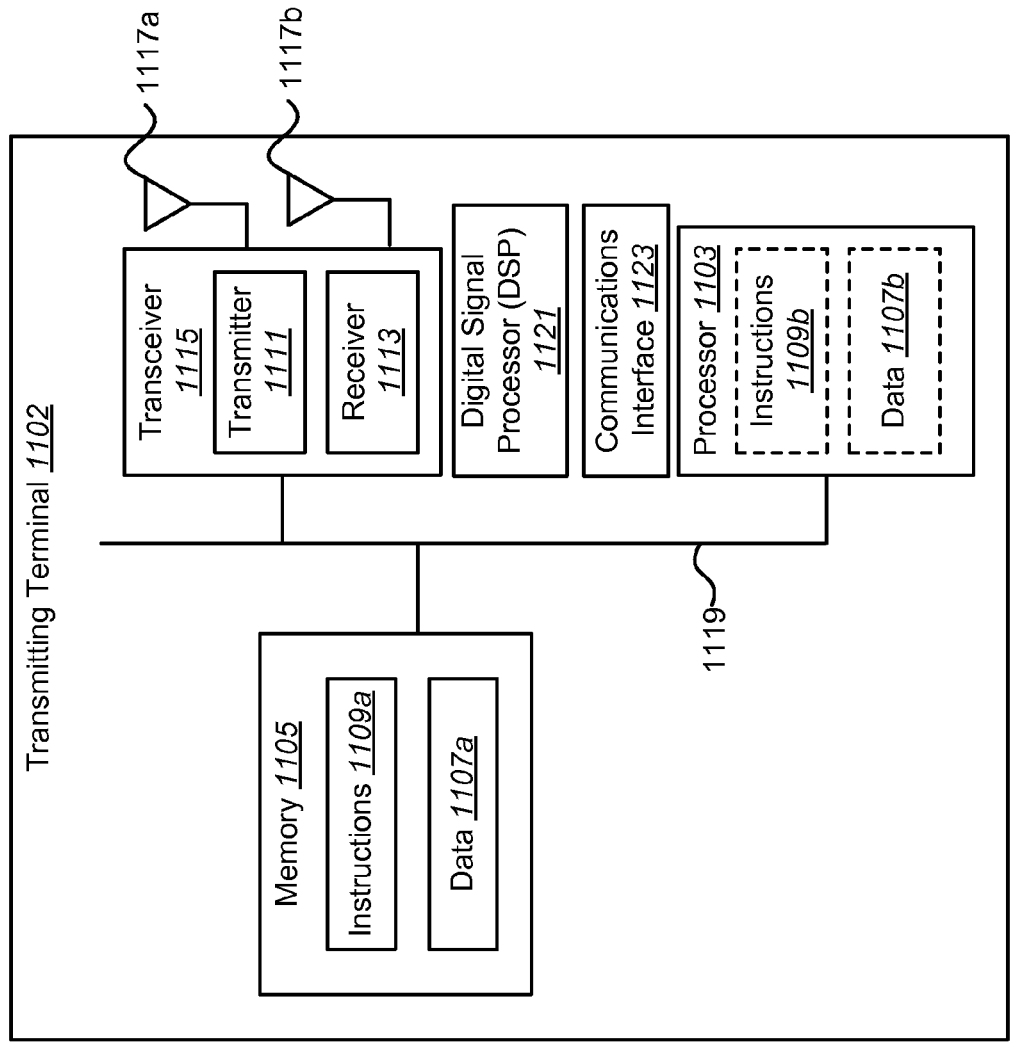
FIG. 11 illustrates certain components that may be included within a transmitting terminal.

FIG. 11 illustrates certain components that may be included within a transmitting terminal 1102. A transmitting terminal 1102 may also be referred to as, and may include some or all of the functionality of, a wireless communication device or a base station. For example, the transmitting terminal 1102 may be the transmitting terminal 102 illustrated in FIG. 1. The transmitting terminal 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the transmitting terminal 1102 of FIG. 11, in an alternative configuration, a combination of processors (e.g., an ARM and DSP) could be used.

The transmitting terminal 1102 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109*a*, various portions of the instructions 1109*b* may be loaded onto the processor 1103, and various pieces of data 1107*b* may be loaded onto the processor 1103.

The transmitting terminal 1102 may also include a transmitter 1111 and a receiver 1113 to allow transmission and reception of signals to and from the transmitting terminal 1102. The transmitter 1111 and receiver 1113 may be collectively referred to as a transceiver 1115. Multiple antennas 1117*a-b* may be electrically coupled to the transceiver 1115. The transmitting terminal 1102 may also include (not shown) multiple transmitters, multiple receivers, multiple transceivers and/or additional antennas.

The transmitting terminal 1102 may include a digital signal processor (DSP) 1121. The transmitting terminal 1102 may also include a communications interface 1123. The communications interface 1123 may allow a user to interact with the transmitting terminal 1102.

The various components of the transmitting terminal 1102 may be coupled together by one or more buses, which may include a power bus, a control signal bus, a status signal bus, a data bus, etc. For the sake of clarity, the various buses are illustrated in FIG. 11 as a bus system 1119.

Figure 12:
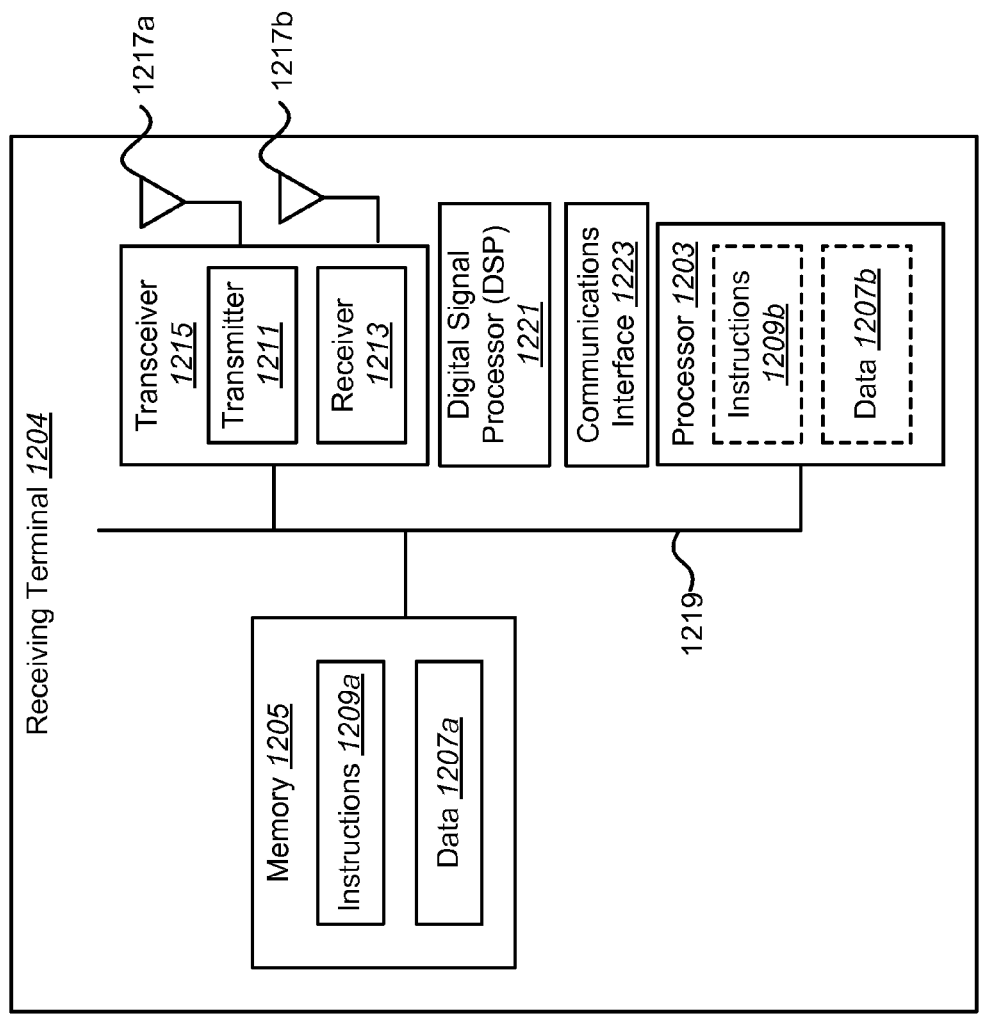
FIG. 12 illustrates certain components that may be included within a receiving terminal.

FIG. 12 illustrates certain components that may be included within a receiving terminal 1204. The receiving terminal 1204 may be a wireless communication device or a base station. For example, the receiving terminal 1204 may be the receiving terminal 104 illustrated in FIG. 1. The receiving terminal 1204 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the receiving terminal 1204 of FIG. 12, in an alternative configuration, a combination of processors (e.g., an ARM and DSP) could be used.

The receiving terminal 1204 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1207*a* and instructions 1209*a* may be stored in the memory 1205. The instructions 1209*a* may be executable by the processor 1203 to implement the methods disclosed herein. Executing the instructions 1209*a* may involve the use of the data 1207*a* that is stored in the memory 1205. When the processor 1203 executes the instructions 1209*a*, various portions of the instructions 1209*b* may be loaded onto the processor 1203, and various pieces of data 1207*b* may be loaded onto the processor 1203.

The receiving terminal 1204 may also include a transmitter 1211 and a receiver 1213 to allow transmission and reception of signals to and from the receiving terminal 1204. The transmitter 1211 and receiver 1213 may be collectively referred to as a transceiver 1215. Multiple antennas 1217*a-b* may be electrically coupled to the transceiver 1215. The receiving terminal 1204 may also include (not shown) multiple transmitters, multiple receivers, multiple transceivers and/or additional antennas.

The receiving terminal 1204 may include a digital signal processor (DSP) 1221. The receiving terminal 1204 may also include a communications interface 1223. The communications interface 1223 may allow a user to interact with the receiving terminal 1204.

The various components of the receiving terminal 1204 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 4 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for quantizing prediction memory during fast recovery coding, comprising:
   quantizing a best shape vector that describes prediction memory for a current frame;
   determining whether to send the quantized best shape vector;
   sending the quantized best shape vector based on the determination; and
   sending an encoded current frame.

2. The method of claim 1, further comprising:
   determining an indication of whether the best shape vector is more accurate than previous prediction memory for one or more previous frames; and
   sending the indication based on the determination of whether the best shape vector is more accurate than previous prediction memory for one or more previous frames.

3. The method of claim 2, further comprising sending quantized location and quantized energy of the prediction memory for the current frame based on the determination of whether to send the quantized best shape vector.

4. The method of claim 3, wherein the quantized best shape vector, quantized location, quantized energy and the indication are sent for every frame.

5. The method of claim 3, wherein the quantized best shape vector, quantized location, quantized energy and the indication are sent based on source-controlled parameters or channel-controlled parameters or both.

6. The method of claim 5, wherein the source-controlled parameters comprise a ratio of an adaptive codebook contribution in the encoded current frame to a fixed codebook contribution in the encoded current frame.

7. The method of claim 5, wherein the channel-controlled parameters comprise available bandwidth in a transmission channel or packet loss rate in a wireless communication system.

8. The method of claim 2, further comprising determining the indication of whether the best shape vector is more accurate than previous prediction memory for one or more previous frames.

9. The method of claim 8, wherein determining the indication comprises:
   reconstructing a best residual signal using a fixed codebook contribution to the encoded current frame and a fast recovery adaptive codebook contribution that is based on the best shape vector;
   selecting previous prediction memory and determining previous prediction memory residual signals based on each previous prediction memory;
   modifying a bit for each selected previous prediction memory in previous prediction memory comparison bits based on a comparison of the previous prediction memory residual signals and the best residual signal;
   including the previous prediction memory comparison bits with the quantized shape vector.

10. The method of claim 9, wherein the best residual signal is a residual signal with a maximum weighted signal-to-noise ratio (SNR).

11. The method of claim 3, wherein the location of the prediction memory is a relative location with maximum amplitude in a portion of a previous frame.

12. A transmitting terminal for quantizing prediction memory during fast recovery coding, comprising:
   a processor;
   memory in electronic communication with the processor;
   instructions stored in the memory, the instructions being executable by the processor to:
      quantize a best shape vector that describes prediction memory for a current frame;
      determine whether to send the quantized best shape vector;
      send the quantized best shape vector based on the determination; and
      send an encoded current frame.

13. The transmitting terminal of claim 12, further comprising instructions executable to:
   determine an indication of whether the best shape vector is more accurate than previous prediction memory for one or more previous frames; and send the indication based on the determination of whether the best shape vector is more accurate than previous prediction memory for one or more previous frames.

14. The transmitting terminal of claim 13, further comprising instructions executable to send quantized location and quantized energy of the prediction memory for the current frame based on the determination of whether to send the quantized best shape vector.

15. The transmitting terminal of claim 14, wherein the quantized best shape vector, quantized location, quantized energy and the indication are sent for every frame.

16. The transmitting terminal of claim 14, wherein the quantized best shape vector, quantized location, quantized energy and the indication are sent based on source-controlled parameters or channel-controlled parameters or both.

17. The transmitting terminal of claim 16, wherein the source-controlled parameters comprise a ratio of an adaptive codebook contribution in the encoded current frame to a fixed codebook contribution in the encoded current frame.

18. The transmitting terminal of claim 16, wherein the channel-controlled parameters comprise available bandwidth in a transmission channel or packet loss rate in a wireless communication system.

19. The transmitting terminal of claim 13, further comprising instructions executable to determine the indication of whether the best shape vector is more accurate than previous prediction memory for one or more previous frames.

20. The transmitting terminal of claim 19, wherein instructions executable to determine the indication comprise instructions executable to:
   reconstruct a best residual signal using a fixed codebook contribution to the encoded current frame and a fast recovery adaptive codebook contribution that is based on the best shape vector;
   select previous prediction memory and determine previous prediction memory residual signals based on each previous prediction memory;
   modify a bit for each selected previous prediction memory in previous prediction memory comparison bits based on a comparison of the previous prediction memory residual signals and the best residual signal;
   include the previous prediction memory comparison bits with the quantized shape vector.

21. The transmitting terminal of claim 20, wherein the best residual signal is a residual signal with a maximum weighted signal-to-noise ratio (SNR).

22. The transmitting terminal of claim 14, wherein the location of the prediction memory is a relative location with maximum amplitude in a portion of a previous frame.

23. A transmitting terminal for quantizing prediction memory during fast recovery coding, comprising:
   means for quantizing a best shape vector that describes prediction memory for a current frame;
   means for determining whether to send the quantized best shape vector;
   means for sending the quantized best shape vector based on the determination; and
   means for sending an encoded current frame.

24. The transmitting terminal of claim 23, further comprising:
   means for determining an indication of whether the best shape vector is more accurate than previous prediction memory for one or more previous frames; and
   means for sending the indication based on the determination of whether the best shape vector is more accurate than previous prediction memory for one or more previous frames.

25. The transmitting terminal of claim 24, further comprising means for sending quantized location and quantized energy of the prediction memory for the current frame based on the determination of whether to send the quantized best shape vector.

26. The transmitting terminal of claim 25, wherein the quantized best shape vector, quantized location, quantized energy and the indication are sent for every frame.

27. The transmitting terminal of claim 25, wherein the quantized best shape vector, quantized location, quantized energy and the indication are sent based on source-controlled parameters or channel-controlled parameters or both.

28. The transmitting terminal of claim 27, wherein the source-controlled parameters comprise a ratio of an adaptive codebook contribution in the encoded current frame to a fixed codebook contribution in the encoded current frame.

29. A computer-program product for quantizing prediction memory during fast recovery coding, the computer-program product comprising a non-transitory computer-readable medium having instructions thereon, the instructions comprising:
   code for quantizing a best shape vector that describes prediction memory for a current frame;
   code for determining whether to send the quantized best shape vector;
   code for sending the quantized best shape vector based on the determination; and
   code for sending an encoded current frame.

30. The computer-program product of claim 29, further comprising:
   code for determining an indication of whether the best shape vector is more accurate than previous prediction memory for one or more previous frames; and
   code for sending the indication based on the determination of whether the best shape vector is more accurate than previous prediction memory for one or more previous frames.

31. The computer-program product of claim 30, further comprising code for causing the transmitting terminal to send quantized location and quantized energy of the prediction memory for the current frame based on the determination of whether to send the quantized best shape vector.

32. The computer-program product of claim 31, wherein the quantized best shape vector, quantized location, quantized energy and the indication are sent for every frame.

33. The computer-program product of claim 31, wherein the quantized best shape vector, quantized location, quantized energy and the indication are sent based on source-controlled parameters or channel-controlled parameters or both.

34. The computer-program product of claim 33, wherein the source-controlled parameters comprise a ratio of an adaptive codebook contribution in the encoded current frame to a fixed codebook contribution in the encoded current frame.

35. A method for using quantized prediction memory during fast recovery coding, comprising:
   receiving an encoded current frame and encoded prediction memory that comprises location, shape and energy;
   decoding the received encoded prediction memory if a previous frame was an erasure; and
   decoding the encoded current frame using best prediction memory if the previous frame was an erasure.

36. The method of claim 35, further comprising determining the best prediction memory from among the decoded received prediction memory and previous prediction memory for one or more previous received frames.

37. The method of claim 35, further comprising decoding the encoded current frame using stored prediction memory if the previous frame was not an erasure.

38. The method of claim 35, wherein the location of the prediction memory is a relative location with maximum amplitude in a portion of a previous frame.

39. The method of claim 35, wherein the shape describes a portion of a previous frame.

40. The method of claim 35, wherein the energy describes the energy of a previous frame.

41. A receiving terminal for using quantized prediction memory during fast recovery coding, comprising:
  a processor;
  memory in electronic communication with the processor;
  instructions stored in the memory, the instructions being executable by the processor to:
    receive an encoded current frame and encoded prediction memory that comprises location, shape and energy;
    decode the received encoded prediction memory if a previous frame was an erasure; and
    decode the encoded current frame using best prediction memory if the previous frame was an erasure.

42. The receiving terminal of claim 41, further comprising instructions executable to determine the best prediction memory from among the decoded received prediction memory and previous prediction memory for one or more previous received frames.

43. The receiving terminal of claim 41, further comprising instructions executable to decode the encoded current frame using stored prediction memory if the previous frame was not an erasure.

44. The receiving terminal of claim 41, wherein the location of the prediction memory is a relative location with maximum amplitude in a portion of a previous frame.

45. The receiving terminal of claim 41, wherein the shape describes a portion of a previous frame.

46. The receiving terminal of claim 41, wherein the energy describes the energy of a previous frame.

47. A receiving terminal for using quantized prediction memory during fast recovery coding, comprising:
  means for receiving an encoded current frame and encoded prediction memory that comprises location, shape and energy;
  means for decoding the received encoded prediction memory if a previous frame was an erasure; and
  means for decoding the encoded current frame using best prediction memory if the previous frame was an erasure.

48. The receiving terminal of claim 47, further comprising determining the best prediction memory from among the decoded received prediction memory and previous prediction memory for one or more previous received frames.

49. The receiving terminal of claim 47, further comprising decoding the encoded current frame using stored prediction memory if the previous frame was not an erasure.

50. A computer-program product for using quantized prediction memory during fast recovery coding, the computer-program product comprising a non-transitory computer-readable medium having instructions thereon, the instructions comprising:
  code for causing a receiving terminal to receive an encoded current frame and encoded prediction memory that comprises location, shape and energy;
  code for causing a receiving terminal to decode the received encoded prediction memory if a previous frame was an erasure; and
  code for causing a receiving terminal to decode the encoded current frame using best prediction memory if the previous frame was an erasure.

51. The computer-program product of claim 50, further comprising code for causing a receiving terminal to determine the best prediction memory from among the decoded received prediction memory and previous prediction memory for one or more previous received frames.

52. The computer-program product of claim 50, further comprising code for causing a receiving terminal to decode the encoded current frame using stored prediction memory if the previous frame was not an erasure.

* * * * *